United States Patent Office 2,948,783
Patented Aug. 9, 1960

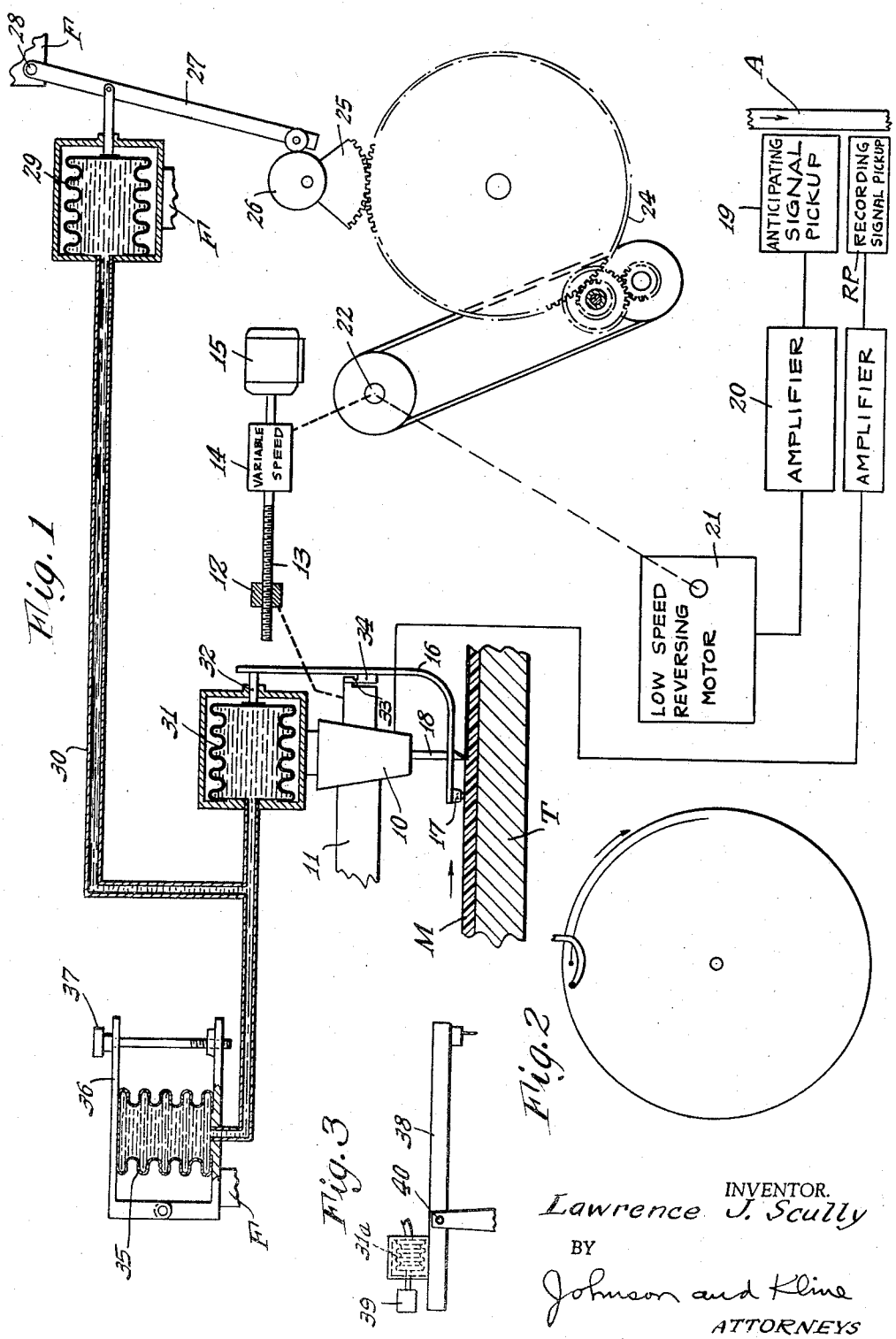

2,948,783

CUTTER CONTROL MEANS FOR CUTTING RECORDING GROOVES

Lawrence J. Scully, 62 Walter St., Bridgeport, Conn.

Filed May 23, 1958, Ser. No. 737,319

5 Claims. (Cl. 179—100.4)

This invention relates to means for controlling the depth of cutting of record grooves in record disks.

The lateral cut used on present long playing records is set at a fixed depth but the pitch (distance from one groove center to the other) may be varied automatically by amplitude (loudness) or frequency of the signal to be recorded. Sound on laterally cut records is produced by the cutting stylus moving from side to side as the groove is being cut on the master so that the louder or the lower the frequency of the signal becomes the greater the distance the stylus moves from side to side. Because of this, it is necessary to provide for the variation in loudness or frequency of the signal by varying the pitch of the cutter head, i.e., the number of lines per inch that is being cut. This is important in recording long playing records and is known as variable pitch recording which may be accomplished by a Scully Automatic Disk Recording machine wherein an optimum number of lines for both extremes, i.e. loud or low frequencies and soft or high frequencies, is used by varying the pitch of the cutter head automatically with the signal of the program material. This is done by anticipating the signal to be cut by picking up the signal from the tape machine approximately two seconds (for 33⅓) ahead of the time at which the signal is picked up by the recording or cutting head and controlling the feeding of the head thereby. During this recording, however, an average depth of cut is used which is a compromise between a shallower groove sufficient for low level (soft or high frequency) passages and a deeper groove needed for high level (loud or low frequency) passages. With the present average groove, during the high level passages, the depth tends to be too shallow for the pickup to safely track the wide lateral excursions and this causes the pickup occasionally to jump out of the groove. Also, with the vertical-lateral and the 45-45 system of stereophonic recording both modulate the groove laterally and vertically. Assuming that the variable pitch will provide a safe recording area for the lateral component of the recorded program, the vertical component will cut deeper and shallower in the natural course of modulating. Consequently, a depth which is sufficient for moderate level recording will cause the stylus to leave the record surface on the upswing of the modulation on high level passages. At this point both the lateral and vertical components of the program are lost. A compromise can be used; however, this would be too deep for the low level passages and too shallow for the high level passages.

The present invention overcomes these difficulties by providing a means for controlling the depth of cut in accordance with the signal to be recorded. This is accomplished by controlling a movable member in accordance with the signal level so as to increase the depth of cut for a high level signal and decrease the cut for a low level signal.

While the control may be effected in many ways, it is at present preferred to accomplish this by means of a closed hydraulic system involving a plurality of bellows and operating one of the bellows in response to the operation of the movable member. The bellows causes a displacement of the fluid in the system and causes a second bellows controlling the position of the cutter head to increase or decrease the depth of cut in accordance with the signal to be recorded. If desired, a third bellows can be connected in the system for adjusting the normal position of the cutter head.

In one form of the invention the follower bellows is connected to an advance ball on the cutter head, which is adapted to rest on the master and control the depth of cut, to alter the position of the advance ball depthwise with respect to the cutter head to control the cut.

In another form of the invention wherein the floating type of cutter head is employed which controls the depth of cut in accordance with the balance of the supporting arm for the cutter head, the follower bellows is connected to a weight to shift the position of the weight to vary the balance of the arm and the amount of cutting by the cutting head.

Other features and advantages of the invention will be apparent from the specification and claims when considered in connection with the accompanying drawings in which:

Figure 1 is a diagrammatic view of the system of the present invention.

Fig. 2 is a plan view showing the relation between the advance ball and cutter.

Fig. 3 is a diagrammatic view of the invention applied to a balanced arm device.

As shown in the drawings, a cutter head 10 is mounted on a cutter arm 11 pivotally or otherwise mounted on the machine frame to move transversely across a master M mounted on a rotating turntable T, the arm being connected to a nut 12 operated by a lead screw 13 driven through a variable speed drive 14 from a source of power 15.

In the form of the invention shown in Fig. 1, the arm has a lever 16 connected to it, which lever rotatably carries a ball 17 at the end thereof which rests on the surface of the master and is located in predetermined relation of the cutter member 18 carried by the cutter head to determine the depth of cut made thereby. As will be noted in Figs. 1 and 2 the advance ball is carried by the arm and engages the surface of the master M in advance of the cutter member to control the latter directly as the cutter head is fed transversely across the disk to produce a spiral path of predetermined pitch as determined by the operation of the lead screw. The pitch of the spiral as determined by the lead screw is controlled by an anticipating signal. The anticipating signal is the signal to be recorded on the master from a tape A and which is picked up by an anticipating signal pickup 19 in advance of the signal picked up by the recording pickup RP for controlling the operation of the cutter head. The anticipating signal is fed from the anticipating signal pickup 19 to an amplifier 20 to a low-speed reversing motor 21 which drives an adjusting shaft 22. For the purpose of adjusting the pitch of the cut groove, the shaft is connected to control the variable speed drive 14 for the screw in accordance with the level of the signal picked up by the anticipating signal pickup, which, for the usual long playing record, is located about two seconds in advance on the tape of the recording pickup RP which is connected to the cutting head. This anticipating signal will cause the variable speed drive to be actuated to slow or speed up the rotation of the screw and hence increase or decrease the pitch of the spiral cut on the record in accordance with the level of the signal.

In accordance with the present invention the anticipating signal is also utilized to control the depth of the cutting. This is accomplished by connecting a gear 24 to the shaft 22 operated by the low-speed reversing motor 21 which will rotate the gear slowly in one direction or the other in accordance with the anticipating signal. The gear is connected to a segment 25 having a movable member 26, herein illustrated as a cam, thereon for controlling the depth of cut in accordance with the movement of the gear in response to the anticipating signal.

While the movable member may control electrical circuits, magnets or mechanical means for varying the cut, in the illustrated form of the invention the movable member 26 operates an actuator 27 which has one end pivoted at 28 to a frame F and the other end engaged by the movable member. The actuator is connected to a bellows 29 connected to a line 30 in a closed fluid system. Also connected in this fluid system is a follower bellows 31 mounted on the cutter arm and having a member 32 connected thereto and applying pressure against one end of the lever 16 connected to the advance ball 17. The lever can be pivotally mounted intermediate the ends thereof to the arm in any way so that movement of the one end of the lever will cause the ball to raise or lower with respect to the cutter member 18 of the cutter head and thus control the depth of cut. In the illustrated form of the invention this is accomplished by forming a weakened portion 33 in a connector bracket 34 connecting the lever to the arm so as to form an integral hinge between the lever and the arm.

With this construction it will be seen that as the anticipating signal causes the reversing motor to rotate in one direction or the other to adjust for the level of the signal, it will cause the movable member 26 to move the actuating member 27 and cause the bellows 29 to displace fluid in the fluid system. The displaced fluid in the system will cause the follower bellows 31 to move and shift the position of the lever and the advance ball to vary the depth of cut in accordance with the level of the signal being recorded.

If desired, a third bellows 35 can be mounted on the frame and connected in the line 30 of the closed fluid system. The bellows is operated by means of a pair of clamping arms 36 controlled by a threaded adjusting member 37 whereby the fluid in the bellows can be displaced to adjust the position of the follower bellows in setting up the original cutting relation between the advance ball and the cutter head so as to compensate for variations in expansion of the fluid or loss of fluid as might be the case.

In the form of the invention shown in Fig. 3, the follower bellows 31a is mounted on the end of a pivoted floating arm 38 and has a weight 39 connected thereto so that as the fluid in the system is displaced, the bellows is actuated and varies the position of the weight with respect to the pivot 40 of the arm causing a variation in the balance in the arm so as to produce a deeper or shallower cut in accordance with the level of the signal.

While the foregoing invention is applicable to lateral cut records, it will be apparent that it is of extreme importance in connection with the lateral-vertical cuts or 45°-45° cuts for stereophonic sound, each of which embodies a vertical component in the cutting of the groove since it will insure the accurate positioning of the cutter depthwise with respect to the master during the cutting operation so that the cutter will be properly positioned for low level signals and will not be lifted above the surface of the master by the vertical component. This will provide a recorded groove which will maintain sufficient control of the needle during the playback of the record.

The depth of cut control, it will be seen, can be used as a separate control, in conjunction with a lateral cut as used on long playing records in which the pitch and depth of cut are simultaneously controlled, or in conjunction with a lateral-vertical or 45°-45° cut as used in stereophonic single track recordings.

Variations and modifications may be made within the scope of the claims and portions of the improvements may be used without others.

I claim:

1. In a machine for cutting recording grooves in a master, means for supporting said master for rotation, cutter means for cutting a groove in said master in accordance with a signal, means including a closed fluid circuit having a first bellows operable to displace fluid in said circuit and a second bellows connected to the cutter means for controlling the depth of cut made by said cutter means and for varying the depth of cut in accordance with the displacement of the fluid in said circuit by said first bellows, and means connected to the first bellows for operating said first bellows to displace said fluid to vary the depth of cut.

2. In a machine for cutting recording grooves in a master, means for supporting said master for rotation, cutter means controlled by a signal for cutting a groove in said master corresponding to said signal, means connected to the cutter means to control the depth of cut produced by said cutter means, means including a closed fluid circuit having a first member for displacing fluid in said circuit and a second member movable by the displaced fluid and connected to the last-named means for varying the depth of cut in accordance with the displacement of the fluid, and anticipating means controlled by said signal for operating the first member to displace said fluid to vary the depth of cut in accordance with the signal to be recorded.

3. In a machine for cutting recording grooves in a master, means for supporting said master for rotation, cutter means controlled by a signal for cutting a groove in said master corresponding to said signal, means connected to the cutter means to control the depth of cut produced by said cutter means, means including a closed fluid circuit having a first member for displacing fluid in said circuit and a second member movable by the displaced fluid and connected to the last-named means for varying the depth of cut in accordance with the displacement of the fluid, a third member connected in said circuit and operable to displace fluid in the circuit to adjust the initial normal position of said second member, and anticipating means controlled by said signal for operating the first member to displace said fluid to vary the depth of cut in accordance with the signal to be recorded.

4. In a machine for cutting recording grooves in a master, means for supporting said master for rotation, cutter means including a balanced pivoted arm having a cutter head thereon controlled by a signal for cutting a groove in said master corresponding to said signal, said arm being balanced on the pivot therefor to control the depth of cut produced by said cutter head, means including a closed fluid circuit having a first bellows for displacing fluid in said circuit and a second bellows connected to the arm and having weight means thereon and movable thereby for varying the balance of the arm and depth of cut in accordance with the displacement of the fluid, and anticipating means controlled by said signal for operating the first bellows to displace said fluid and cause said second bellows to shift the weight means and vary the depth of cut in accordance with the signal to be recorded.

5. In a machine for cutting recording grooves in a master, means for supporting said master for rotation, cutter means including a pivoted arm having a cutter head controlled by a signal for cutting a groove in said master corresponding to said signal, master contacting means connected to the cutter arm to rest on the surface of the master and control the depth of cut produced by said cutter head, means including a closed fluid circuit having a first bellows for displacing fluid in said circuit and a second bellows connected to the master contacting means for varying the relative position of the master contacting means and cutter head to vary the depth of cut in accordance with the displacement of the fluid, and anticipating means controlled by said signal for operating the first bellows to displace said fluid to vary the depth of cut in accordance with the signal to be recorded.

References Cited in the file of this patent

UNITED STATES PATENTS

| | | |
|---|---|---|
| 2,112,699 | Kleber | Mar. 29, 1938 |
| 2,284,744 | Kellogg | June 2, 1942 |
| 2,847,514 | Evans | Aug. 12, 1958 |
| 2,867,694 | Pearson | Jan. 6, 1959 |

FOREIGN PATENTS

| | | |
|---|---|---|
| 770,465 | Great Britain | Mar. 20, 1957 |